US008317893B2

(12) United States Patent
Stevens et al.

(10) Patent No.: US 8,317,893 B2
(45) Date of Patent: Nov. 27, 2012

(54) DOWNHOLE TOOL PARTS AND COMPOSITIONS THEREOF

(75) Inventors: John H. Stevens, Spring, TX (US); Jimmy W. Eason, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/158,368

(22) Filed: Jun. 10, 2011

(65) Prior Publication Data

US 2011/0239545 A1 Oct. 6, 2011

Related U.S. Application Data

(62) Division of application No. 12/479,534, filed on Jun. 5, 2009.

(51) Int. Cl.
C22C 29/00 (2006.01)
E21B 10/08 (2006.01)

(52) U.S. Cl. .............. 75/240; 75/243; 75/244; 175/374; 175/425

(58) Field of Classification Search .................... 75/240; 175/374, 425
See application file for complete search history.

(56) References Cited

U.S. PATENT DOCUMENTS

| | | | |
|---|---|---|---|
| 2,299,207 A | 10/1942 | Bevillard |
| 2,819,958 A | 1/1958 | Abkowitz et al. |
| 2,819,959 A | 1/1958 | Abkowitz et al. |
| 2,906,654 A | 9/1959 | Abkowitz et al. |
| 3,368,881 A | 2/1968 | Abkowitz et al. |
| 3,471,921 A | 10/1969 | Feenstra |
| 3,660,050 A | 5/1972 | Iler et al. |
| 3,757,879 A | 9/1973 | Wilder et al. |
| 3,942,954 A | 3/1976 | Frehn |
| 3,987,859 A | 10/1976 | Lichte |
| 4,017,480 A | 4/1977 | Baum |
| 4,047,828 A | 9/1977 | Makely |
| 4,094,709 A | 6/1978 | Rozmus |
| 4,128,136 A | 12/1978 | Generoux |
| 4,198,233 A | 4/1980 | Frehn |
| 4,221,270 A | 9/1980 | Vezirian |
| 4,229,638 A | 10/1980 | Lichte |
| 4,233,720 A | 11/1980 | Rozmus |
| 4,255,165 A | 3/1981 | Dennis et al. |
| 4,276,788 A | 7/1981 | van Nederveen |
| 4,306,139 A | 12/1981 | Shinozaki et al. |
| 4,334,928 A | 6/1982 | Hara et al. |
| 4,341,557 A | 7/1982 | Lizenby |
| 4,351,401 A | 9/1982 | Fielder |
| 4,389,952 A | 6/1983 | Dreier et al. |
| 4,398,952 A | 8/1983 | Drake |
| 4,423,646 A | 1/1984 | Bernhardt |
| 4,499,048 A | 2/1985 | Hanejko |
| 4,499,795 A | 2/1985 | Radtke |
| 4,520,882 A | 6/1985 | van Nederveen |
| 4,526,748 A | 7/1985 | Rozmus |
| 4,547,337 A | 10/1985 | Rozmus |
| 4,552,232 A | 11/1985 | Frear |
| 4,554,130 A | 11/1985 | Ecer |
| 4,562,990 A | 1/1986 | Rose |
| 4,579,713 A | 4/1986 | Lueth |
| 4,596,694 A | 6/1986 | Rozmus |
| 4,597,456 A | 7/1986 | Ecer |
| 4,597,730 A | 7/1986 | Rozmus |
| 4,630,693 A | 12/1986 | Goodfellow |
| 4,656,002 A | 4/1987 | Lizenby et al. |
| 4,667,756 A | 5/1987 | King et al. |
| 4,686,080 A | 8/1987 | Hara et al. |
| 4,694,919 A | 9/1987 | Barr |
| 4,743,515 A | 5/1988 | Fischer et al. |
| 4,744,943 A | 5/1988 | Timm |
| 4,780,274 A | 10/1988 | Barr |
| 4,804,049 A | 2/1989 | Barr |
| 4,809,903 A | 3/1989 | Eylon et al. |
| 4,838,366 A | 6/1989 | Jones |
| 4,871,377 A | 10/1989 | Frushour |
| 4,884,477 A | 12/1989 | Smith et al. |
| 4,889,017 A | 12/1989 | Fuller et al. |
| 4,899,838 A | 2/1990 | Sullivan et al. |
| 4,919,013 A | 4/1990 | Smith et al. |
| 4,923,512 A | 5/1990 | Timm et al. |
| 4,956,012 A | 9/1990 | Jacobs et al. |
| 4,968,348 A | 11/1990 | Abkowitz et al. |
| 4,991,670 A | 2/1991 | Fuller et al. |
| 5,000,273 A | 3/1991 | Horton et al. |

(Continued)

FOREIGN PATENT DOCUMENTS

AU 695583 2/1998

(Continued)

OTHER PUBLICATIONS

US 4,966,627, 9/1990, Keshavan et al. (withdrawn).
International Search Report and Written Opinion for PCT/US2005/014742, completed Jul. 25, 2005.
International Preliminary Report on Patentability for PCT/US2005/014742, dated Nov. 1, 2006.
Sims et al., Superalloys II, Casting Engineering, Aug. 1987, pp. 420-426.
Sikkenga, Cobalt and Cobalt Alloy Castings, Casting, vol. 15, ASM Handbook, ASM International, 2008, pp. 1114-1118.
Pyrotek, Zyp Zircwash, www.pyrotek.info, no date, 1 page.

(Continued)

Primary Examiner — Roy King
Assistant Examiner — Ngoclan T Mai
(74) Attorney, Agent, or Firm — TraskBritt

(57) ABSTRACT

Methods, systems, and compositions for manufacturing downhole tools and downhole tool parts for drilling subterranean material are disclosed. A model having an external peripheral shape of a downhole tool or tool part is fabricated. Mold material is applied to the external periphery of the model. The mold material is permitted to harden to form a mold about the model. The model is eliminated and a composite matrix material is cast within the mold to form a finished downhole tool or tool part.

8 Claims, 10 Drawing Sheets

U.S. PATENT DOCUMENTS

| | | | |
|---|---|---|---|
| 5,010,945 A | 4/1991 | Burke | |
| 5,030,598 A | 7/1991 | Hsieh | |
| 5,032,352 A | 7/1991 | Meeks et al. | |
| 5,049,450 A | 9/1991 | Dorfman et al. | |
| 5,090,491 A | 2/1992 | Tibbitts et al. | |
| 5,092,412 A | 3/1992 | Walk | |
| 5,161,898 A | 11/1992 | Drake | |
| 5,232,522 A | 8/1993 | Doktycz et al. | |
| 5,281,260 A | 1/1994 | Kumar et al. | |
| 5,286,685 A | 2/1994 | Schoennahl et al. | |
| 5,311,958 A | 5/1994 | Isbell et al. | |
| 5,348,806 A | 9/1994 | Kojo et al. | |
| 5,373,907 A | 12/1994 | Weaver | |
| 5,433,280 A | 7/1995 | Smith | |
| 5,443,337 A | 8/1995 | Katayama | |
| 5,452,771 A | 9/1995 | Blackman et al. | |
| 5,479,997 A | 1/1996 | Scott et al. | |
| 5,482,670 A | 1/1996 | Hong | |
| 5,484,468 A | 1/1996 | Ostlund et al. | |
| 5,506,055 A | 4/1996 | Dorfman et al. | |
| 5,518,077 A | 5/1996 | Blackman et al. | |
| 5,525,134 A | 6/1996 | Mehrotra et al. | |
| 5,543,235 A | 8/1996 | Mirchandani et al. | |
| 5,544,550 A | 8/1996 | Smith | |
| 5,560,440 A | 10/1996 | Tibbitts | |
| 5,586,612 A | 12/1996 | Isbell et al. | |
| 5,593,474 A | 1/1997 | Keshavan et al. | |
| 5,611,251 A | 3/1997 | Katayama | |
| 5,612,264 A | 3/1997 | Nilsson et al. | |
| 5,641,251 A | 6/1997 | Leins et al. | |
| 5,641,921 A | 6/1997 | Dennis et al. | |
| 5,662,183 A | 9/1997 | Fang | |
| 5,666,864 A | 9/1997 | Tibbitts | |
| 5,677,042 A | 10/1997 | Massa et al. | |
| 5,679,445 A | 10/1997 | Massa et al. | |
| 5,697,046 A | 12/1997 | Conley | |
| 5,697,462 A | 12/1997 | Grimes et al. | |
| 5,732,783 A | 3/1998 | Truax et al. | |
| 5,733,649 A | 3/1998 | Kelley et al. | |
| 5,733,664 A | 3/1998 | Kelley et al. | |
| 5,753,160 A | 5/1998 | Takeuchi et al. | |
| 5,755,298 A | 5/1998 | Langford, Jr. et al. | |
| 5,765,095 A | 6/1998 | Flak et al. | |
| 5,776,593 A | 7/1998 | Massa et al. | |
| 5,778,301 A | 7/1998 | Hong | |
| 5,789,686 A | 8/1998 | Massa et al. | |
| 5,792,403 A | 8/1998 | Massa et al. | |
| 5,803,152 A | 9/1998 | Dolman et al. | |
| 5,806,934 A | 9/1998 | Massa et al. | |
| 5,830,256 A | 11/1998 | Northrop et al. | |
| 5,856,626 A | 1/1999 | Fischer et al. | |
| 5,865,571 A | 2/1999 | Tankala et al. | |
| 5,866,254 A * | 2/1999 | Peker et al. | 428/378 |
| 5,880,382 A | 3/1999 | Fang et al. | |
| 5,893,204 A | 4/1999 | Symonds | |
| 5,897,830 A | 4/1999 | Abkowitz et al. | |
| 5,899,257 A | 5/1999 | Alleweireldt et al. | |
| 5,957,006 A | 9/1999 | Smith | |
| 5,963,775 A | 10/1999 | Fang | |
| 6,029,544 A | 2/2000 | Katayama | |
| 6,051,171 A | 4/2000 | Takeuchi et al. | |
| 6,063,333 A | 5/2000 | Dennis | |
| 6,068,070 A | 5/2000 | Scott | |
| 6,073,518 A | 6/2000 | Chow et al. | |
| 6,086,980 A | 7/2000 | Foster et al. | |
| 6,089,123 A | 7/2000 | Chow et al. | |
| 6,109,377 A | 8/2000 | Massa et al. | |
| 6,109,677 A | 8/2000 | Anthony | |
| 6,135,218 A | 10/2000 | Deane et al. | |
| 6,148,936 A | 11/2000 | Evans et al. | |
| 6,200,514 B1 | 3/2001 | Meister | |
| 6,209,420 B1 | 4/2001 | Butcher et al. | |
| 6,214,134 B1 | 4/2001 | Eylon et al. | |
| 6,214,287 B1 | 4/2001 | Waldenstrom | |
| 6,220,117 B1 | 4/2001 | Butcher | |
| 6,227,188 B1 | 5/2001 | Tankala et al. | |
| 6,228,139 B1 | 5/2001 | Oskarsson | |
| 6,241,036 B1 | 6/2001 | Lovato et al. | |
| 6,254,658 B1 | 7/2001 | Taniuchi et al. | |
| 6,287,360 B1 | 9/2001 | Kembaiyan et al. | |
| 6,290,438 B1 | 9/2001 | Papajewski | |
| 6,293,986 B1 | 9/2001 | Rodiger et al. | |
| 6,302,224 B1 | 10/2001 | Sherwood, Jr. | |
| 6,353,771 B1 | 3/2002 | Southland | |
| 6,372,346 B1 | 4/2002 | Toth | |
| 6,375,706 B2 | 4/2002 | Kembaiyan et al. | |
| 6,453,899 B1 | 9/2002 | Tselesin | |
| 6,454,025 B1 | 9/2002 | Runquist et al. | |
| 6,454,028 B1 | 9/2002 | Evans | |
| 6,454,030 B1 | 9/2002 | Findley et al. | |
| 6,458,471 B2 | 10/2002 | Lovato et al. | |
| 6,474,425 B1 | 11/2002 | Truax et al. | |
| 6,500,226 B1 | 12/2002 | Dennis | |
| 6,511,265 B1 | 1/2003 | Keller et al. | |
| 6,546,991 B2 | 4/2003 | Dworog et al. | |
| 6,576,182 B1 | 6/2003 | Ravagni et al. | |
| 6,589,640 B2 | 7/2003 | Griffin et al. | |
| 6,599,467 B1 | 7/2003 | Yamaguchi et al. | |
| 6,607,693 B1 | 8/2003 | Saito et al. | |
| 6,651,757 B2 | 11/2003 | Belnap et al. | |
| 6,655,481 B2 | 12/2003 | Findley et al. | |
| 6,655,882 B2 | 12/2003 | Heinrich et al. | |
| 6,685,880 B2 | 2/2004 | Engstrom et al. | |
| 6,742,608 B2 | 6/2004 | Murdoch | |
| 6,742,611 B1 | 6/2004 | Illerhaus et al. | |
| 6,756,009 B2 | 6/2004 | Sim et al. | |
| 6,766,870 B2 | 7/2004 | Overstreet | |
| 6,767,505 B2 | 7/2004 | Witherspoon et al. | |
| 6,782,958 B2 | 8/2004 | Liang et al. | |
| 6,799,648 B2 | 10/2004 | Brandenberg et al. | |
| 6,849,231 B2 | 2/2005 | Kojima et al. | |
| 6,918,942 B2 | 7/2005 | Hatta et al. | |
| 7,044,243 B2 | 5/2006 | Kembaiyan et al. | |
| 7,048,081 B2 | 5/2006 | Smith et al. | |
| 7,250,069 B2 | 7/2007 | Kembaiyan et al. | |
| 7,261,782 B2 | 8/2007 | Hwang et al. | |
| 7,270,679 B2 | 9/2007 | Istephanous et al. | |
| 7,556,668 B2 | 7/2009 | Eason et al. | |
| 7,661,491 B2 | 2/2010 | Kembaiyan et al. | |
| 7,687,156 B2 | 3/2010 | Fang et al. | |
| 8,020,640 B2 * | 9/2011 | Lockwood et al. | 175/431 |
| 2002/0004105 A1 | 1/2002 | Kunze et al. | |
| 2002/0020564 A1 | 2/2002 | Fang et al. | |
| 2002/0175006 A1 | 11/2002 | Findley et al. | |
| 2003/0010409 A1 | 1/2003 | Kunze et al. | |
| 2003/0041922 A1 | 3/2003 | Hirose et al. | |
| 2003/0219605 A1 | 11/2003 | Molian et al. | |
| 2004/0013558 A1 | 1/2004 | Kondoh et al. | |
| 2004/0060742 A1 | 4/2004 | Kembaiyan et al. | |
| 2004/0149494 A1 | 8/2004 | Kembaiyan et al. | |
| 2004/0196638 A1 | 10/2004 | Lee et al. | |
| 2004/0243241 A1 | 12/2004 | Istephanous et al. | |
| 2004/0244540 A1 | 12/2004 | Oldham et al. | |
| 2004/0245022 A1 | 12/2004 | Izaguirre et al. | |
| 2004/0245024 A1 | 12/2004 | Kembaiyan | |
| 2005/0008524 A1 | 1/2005 | Testani | |
| 2005/0072496 A1 | 4/2005 | Hwang et al. | |
| 2005/0084407 A1 | 4/2005 | Myrick | |
| 2005/0117984 A1 | 6/2005 | Eason et al. | |
| 2005/0126334 A1 | 6/2005 | Mirchandani | |
| 2005/0211475 A1 | 9/2005 | Mirchandani et al. | |
| 2005/0247491 A1 | 11/2005 | Mirchandani et al. | |
| 2005/0268746 A1 | 12/2005 | Abkowitz et al. | |
| 2006/0016521 A1 | 1/2006 | Hanusiak et al. | |
| 2006/0032335 A1 | 2/2006 | Kembaiyan | |
| 2006/0032677 A1 | 2/2006 | Azar et al. | |
| 2006/0043648 A1 | 3/2006 | Takeuchi et al. | |
| 2006/0057017 A1 | 3/2006 | Woodfield et al. | |
| 2006/0131081 A1 | 6/2006 | Mirchandani et al. | |
| 2007/0042217 A1 | 2/2007 | Fang et al. | |
| 2007/0056777 A1 | 3/2007 | Overstreet | |
| 2007/0102198 A1 | 5/2007 | Oxford et al. | |
| 2007/0102199 A1 | 5/2007 | Smith et al. | |
| 2007/0102200 A1 | 5/2007 | Choe et al. | |
| 2007/0102202 A1 | 5/2007 | Choe et al. | |
| 2007/0151770 A1 | 7/2007 | Ganz | |
| 2007/0193782 A1 | 8/2007 | Fang et al. | |

| | | | |
|---|---|---|---|
| 2007/0277651 A1 | 12/2007 | Calnan et al. | |
| 2008/0011519 A1 | 1/2008 | Smith et al. | |
| 2008/0028891 A1 | 2/2008 | Calnan et al. | |
| 2008/0101977 A1 | 5/2008 | Eason et al. | |
| 2008/0163723 A1 | 7/2008 | Mirchandani et al. | |
| 2008/0302576 A1 | 12/2008 | Mirchandani et al. | |
| 2009/0301788 A1 | 12/2009 | Stevens et al. | |
| 2010/0193252 A1 | 8/2010 | Mirchandani et al. | |
| 2011/0284179 A1 | 11/2011 | Stevens et al. | |
| 2011/0287238 A1 | 11/2011 | Stevens et al. | |
| 2011/0287924 A1 | 11/2011 | Stevens | |

FOREIGN PATENT DOCUMENTS

| | | |
|---|---|---|
| CA | 2212197 | 10/2000 |
| EP | 0264674 | 4/1988 |
| EP | 0453428 | 10/1991 |
| EP | 0995876 | 4/2000 |
| EP | 1244531 | 10/2002 |
| GB | 945227 | 12/1963 |
| GB | 2315452 A | 2/1998 |
| GB | 2384745 A | 8/2003 |
| GB | 2385350 | 8/2003 |
| GB | 2393449 | 3/2004 |
| JP | 5-064288 | 8/1993 |
| JP | 10219385 | 8/1998 |
| UA | 6742 | 12/1994 |
| UA | 63469 | 1/2006 |
| UA | 23749 | 11/2007 |
| WO | 03049889 | 6/2003 |
| WO | 2004053197 | 6/2004 |
| WO | WO 2007/127899 | 11/2007 |

OTHER PUBLICATIONS

Starck, H.C., Surface Technology, Powders for PTA-Welding, Lasercladding and other Wear Protective Welding Applications, AMPERWELD, 4 pages.

International Preliminary Report on Patentability with Written Opinion for International Application No. PCT/US2010/037056 dated Dec. 6, 2011, 6 pages.

International Search Report for International Application No. PCT/US2010/037056 dated Jan. 14, 2011, 5 pages.

\* cited by examiner

DOWNHOLE TOOL PARTS AND COMPOSITIONS THEREOF

CROSS-REFERENCE TO RELATED APPLICATIONS

This application is a divisional of U.S. patent application Ser. No. 12/479,534, filed Jun. 5, 2009, now U.S. Pat. No. 8,201,610, issued Jun. 19, 2012, and is related to the subject matter of U.S. patent application Ser. No. 13/158,361, filed Jun. 10, 2011, pending, which is a divisional of the aforementioned U.S. patent application Ser. No. 12/479,534. The subject matter of this application is also related to the subject matter of U.S. patent application Ser. No. 10/848,437, filed May 18, 2004, now abandoned; U.S. patent application Ser. No. 12/192,292, filed Aug. 15, 2008, now U.S. Pat. No. 8,172,914, issued May 8, 2012, which is a divisional of the aforementioned U.S. patent application Ser. No. 10/848,437; U.S. patent application Ser. No. 13/309,232, filed Dec. 1, 2011, now pending, which is a divisional of the aforementioned U.S. patent application Ser. No. 12/192,292; U.S. patent application Ser. No. 11/116,752, filed Apr. 28, 2005, now U.S. Pat. No. 7,954,569, issued Jun. 7, 2011, which is a continuation-in-part of the aforementioned U.S. patent application Ser. No. 10/848,437; U.S. patent application Ser. No. 11/932,027, filed Oct. 31, 2007, now abandoned, which was a continuation of the aforementioned U.S. patent application Ser. No. 11/116,752; U.S. patent application Ser. No. 12/033,960, filed Feb. 20, 2008, now U.S. Pat. No. 8,007,714, issued Aug. 30, 2011, which is a divisional of the aforementioned U.S. patent application Ser. No. 11/116,752; U.S. patent application Ser. No. 12/763,968, filed Apr. 20, 2010, now U.S. Pat. No. 8,087,324, issued Jan. 3, 2012, which is a continuation of the aforementioned U.S. patent application Ser. No. 11/116,752; U.S. patent application Ser. No. 13/309,264, filed Dec. 1, 2011, now pending, which is a divisional of the aforementioned U.S. patent application Ser. No. 12/763,968; U.S. patent application Ser. No. 13/111,666, filed May 19, 2011, pending; U.S. patent application Ser. No. 13/111,739, filed May 19, 2011, pending; and U.S. patent application Ser. No. 13/111,783, filed May 19, 2011, pending.

FIELD

The present application is directed to methods, systems, and compositions for manufacturing downhole tools and downhole tool parts having increased wear resistance, strength, and toughness.

BACKGROUND

Downhole tools and tool parts including roller cone bits and fixed-cutter drag bits are machined from steel or fabricated by infiltrating a bed of hard particles, such as cast carbide and/or sintered cemented carbide, with a binder, such as a copper-base alloy.

Steel bodied bits are typically fabricated from a round stock or a blank machined to a desired geometry including external and internal features of the bit body. Hardfacing techniques may be used to apply wear-resistant materials to the face of the bit body and other critical areas of the surface of the bit body.

Conventional metal particulate-based infiltration involves placing a bed of hard particles within a mold and consolidating the bed to the desired density. The consolidated bed of hard particles is infiltrated with a molten binder that solidifies to form a solid bit body including a discontinuous phase of hard particles within a continuous phase of binder.

Cutting elements or inserts are fixed to the fabricated bit body within pockets at predetermined positions to optimize the rate of penetration into a subterranean formation. Cutting elements or inserts are secured to the pockets within the bit body by brazing, welding, adhesive bonding, or mechanical pressing after the bit body is fabricated.

Improved methods, systems, and compositions for manufacturing downhole tools and tool parts having increased wear resistance, strength, and toughness are herein disclosed.

SUMMARY

Methods, systems, and compositions for manufacturing downhole tools and downhole tool parts for drilling subterranean material are disclosed. A model having an external peripheral shape of a downhole tool or tool part is fabricated. Mold material is applied to the external periphery of the model. The mold material is permitted to harden to form a mold about the model. The model is eliminated and a composite matrix material is cast within the mold to form a finished downhole tool or tool part.

The foregoing and other objects, features, and advantages of the present disclosure will become more readily apparent from the following detailed description of exemplary embodiments as disclosed herein.

BRIEF DESCRIPTION OF THE DRAWINGS

Embodiments of the present application will now be described, by way of example only, with reference to the attached figures, wherein.

DETAILED DESCRIPTION

Figure 1:
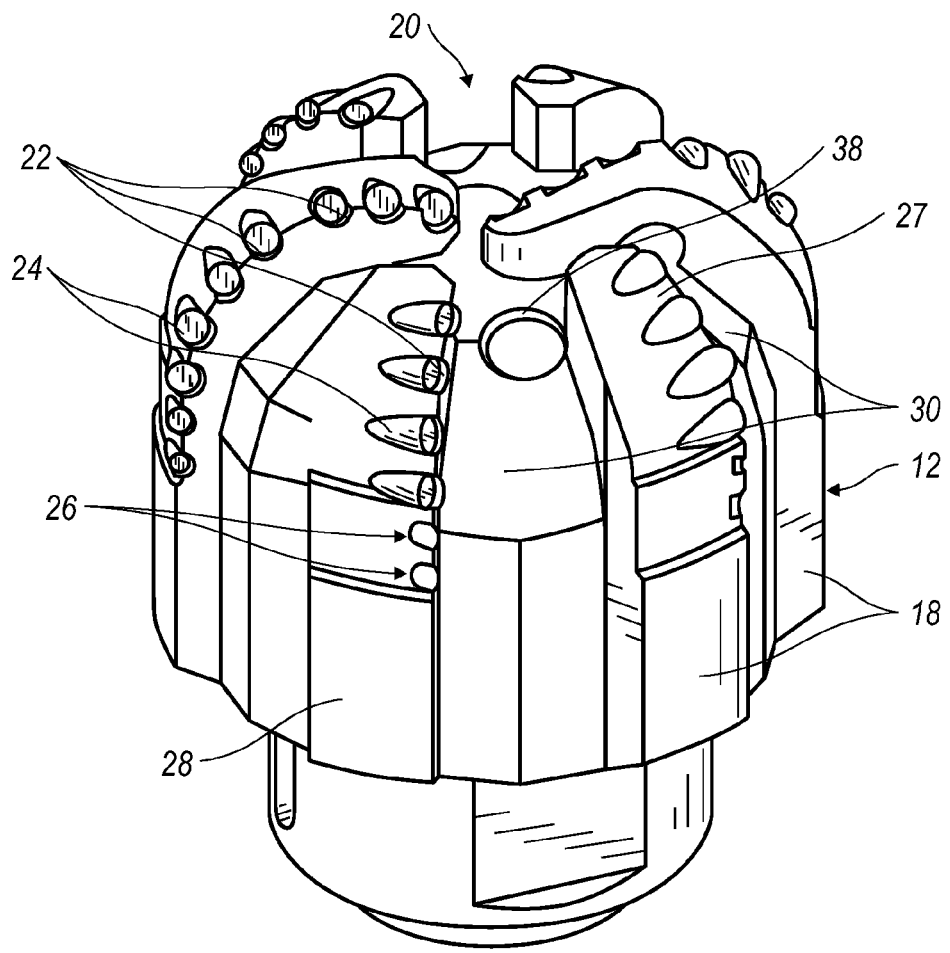
FIG. 1 is an inverted perspective view of an exemplary three-dimensional fixed-cutter bit body model according to one embodiment.

It will be appreciated that, for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures, and components have not been described in detail so as not to obscure the embodiments described herein. Downhole tools such as roller cone bits, fixed-cutter drag bits, casing bits, reamers, bi-center rotary drill bits, reamer wings, down-hole milling tools, bi-center drill bits, well completion equipment, and/or other drilling tools known in the art for drilling subterranean material and completing subterranean wells may be manufactured using systems and methods disclosed herein. As used herein, the term "downhole tool" encompasses any and all such apparatuses and component parts thereof.

FIG. 1 is an inverted perspective view of an exemplary three-dimensional fixed-cutter bit body model 12 according to one embodiment. The bit body model 12 may be fabricated using three-dimensional modeling systems and layered manufacturing processes including, but not limited to, selective laser sintering (SLS), stereolithography (STL), three-dimensional printing, laminated object manufacturing (LOM), or any other rapid prototyping method for producing a three-dimensional bit body model 12 such as those disclosed in U.S. Pat. No. 6,200,514, incorporated herein by reference. The bit body model 12 may also be fabricated by hand.

The bit body model 12 may be constructed from material such as wax, polymer, or combinations thereof. The bit body model 12 includes a plurality of longitudinally extending blades 18 that define a plurality of adjacent junk slots 30 thereinbetween. Cutter pockets 22 for securing cutting elements are formed in the bit body model 12 along the leading peripheral edge 27 of each blade 18 proximate the distal end 20 of the bit body model 12. A plurality of rows of cutter pockets 22 may be provided to secure a plurality of rows of cutting elements. Cutter pockets 22 may also include inclined buttresses 24 to support cutting elements from the rear. Nozzle cavities 38 for securing nozzles are formed in the bit body model 12 within the junk slots 30. Gage pads 28 are positioned at the external periphery of the bit body model 12 longitudinally adjacent to each blade 18. Gage trimmer pockets 26 for securing gage trimmers are formed in the bit body model 12 immediately adjacent and above the gage pads 28. The bit body model 12 may be used to fabricate a fixed cutter bit body mold.

Figure 2A:
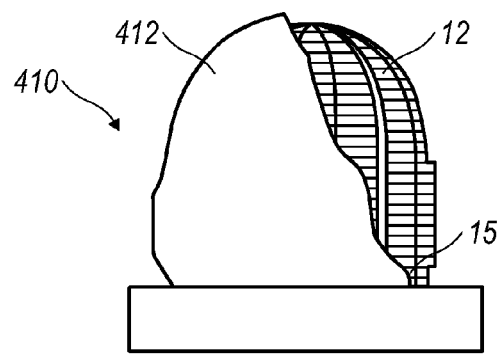
FIGS. 2A through 2C illustrate an exemplary system and method for fabricating a bit body mold from a bit body model according to one embodiment.
Figure 2B:
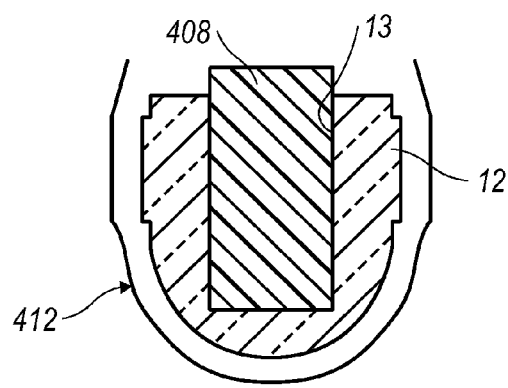
Figure 2C:
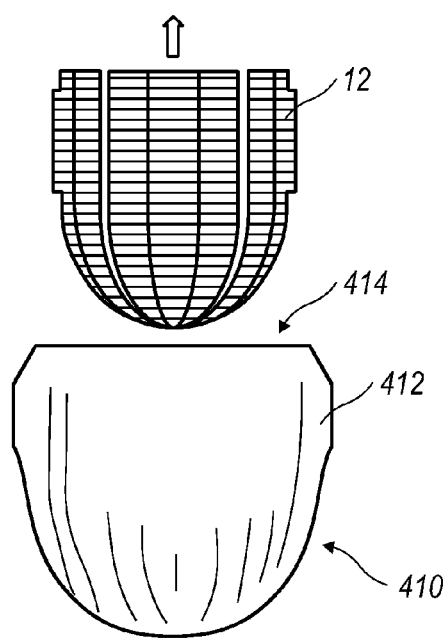

FIGS. 2A through 2C illustrate an exemplary system and method for fabricating a bit body mold 410 from a bit body model 12 according to one embodiment. Preferably, mold material 412 will not substantially degrade the bit body model 12. To ensure proper removal of the bit body model 12 from the mold 410, the mold material 412 is selected to harden at a temperature lower than the melting temperature of bit body model 12 (e.g., 100° C.). The external periphery of the bit body model 12 may be coated with a mold release material that resists adherence to the mold material 412. Mold release material may comprise tetra-fluoroethylene, waxy materials, or oils that facilitate removal of the bit body model 12 from a hardened mold 410. Mold material 412 may comprise ceramic, sand, graphite, clay, plastic, rubber, wax, refractory material, and/or other material known in the art for fabricating downhole tool molds.

In an example embodiment, at least one first internal layer of zirconium silicate ($ZrSiO_4$) mold material 412 is applied to the external periphery of bit body model 12 to ensure a proper surface finish of the mold 410. Additional layers of mold material 412 including, but not limited to, ceramic, sand, graphite, clay, plastic, rubber, wax, or refractory material may be applied on top of at least one layer of zirconium silicate ($ZrSiO_4$) to finish and strengthen the mold 410 for handling.

Preferably, a base 15 of the bit body model 12 remains exposed through the mold material 412 during application of the mold material 412 to the external periphery of the bit body model 12. A base 15 or other portion of the bit body model 12 may also be exposed through the mold 410 to create an opening 414 (shown in FIG. 2C) after the mold 410 has hardened.

Referring to FIG. 2B, displacement materials, mold inserts, and/or performs 408 made from consolidated sand, graphite, or other materials, may be disposed within an internal cavity 13 of bit body model 12 to provide support, prevent collapse, and prevent distortion of the bit body model 12 during application of the mold material 412 to the external periphery of bit body model 12. Preforms 408 may also be used to create protrusions that define the exterior geometry of the bit body model 12.

Referring to FIG. 2A, mold material 412 may be applied to bit body model 12 in several ways including, but not limited to, submerging the bit body model 12 in a slurry of mold material 412, spraying a quantity of mold material 412 on the external periphery of the bit body model 12, placing the bit body model 12 into a container and pouring mold material 412 around the bit body model 12, applying mold material 412 in a slurry or paste form to the external periphery of the bit body model 12, or blowing mold material 412 in the slurry or paste form on the external periphery of the bit body model 12.

Mold material 412 may be applied to the bit body model 12 in a plurality of thin layers. Prior to application of each layer of mold material 412, the previous layer may be permitted to cure or substantially harden. The bit body model 12 may also be submerged in a slurry of mold material 412 a plurality of times. Prior to each submersion, the previous layer of mold material 412 may be permitted to cure or substantially harden. Mold material 412 may be cured or substantially hardened at ambient temperature or at an increased temperature that will not melt or degrade the bit body model 12. Curing may be facilitated with an air blower or by baking the mold 410 in an oven.

It is also contemplated that bit body elements such as cutting elements, nozzles, gage trimmers, bearing elements, cutting control structures, or other bit body elements known in the art may be positioned within the mold 410 before the mold material 412 cures or substantially hardens. After bit body elements are positioned within the mold 410, the mold 410 may be fully cured. During casting of the downhole tool or tool part, described in further detail below, a composite matrix material is cast into the mold 410 and about a portion of the bit body elements to form a metallurgical bond between the composite matrix material and the bit body elements.

Referring to FIG. 2C, once the mold material 412 has cured or sufficiently hardened, the bit body model 12 is removed from the mold 410, through an opening 414 of the mold 410. If the bit body model 12 is sufficiently hollow, it may be collapsed to facilitate removal from the mold 410. The bit body model 12 may then be used to produce another mold 410.

Figure 3:
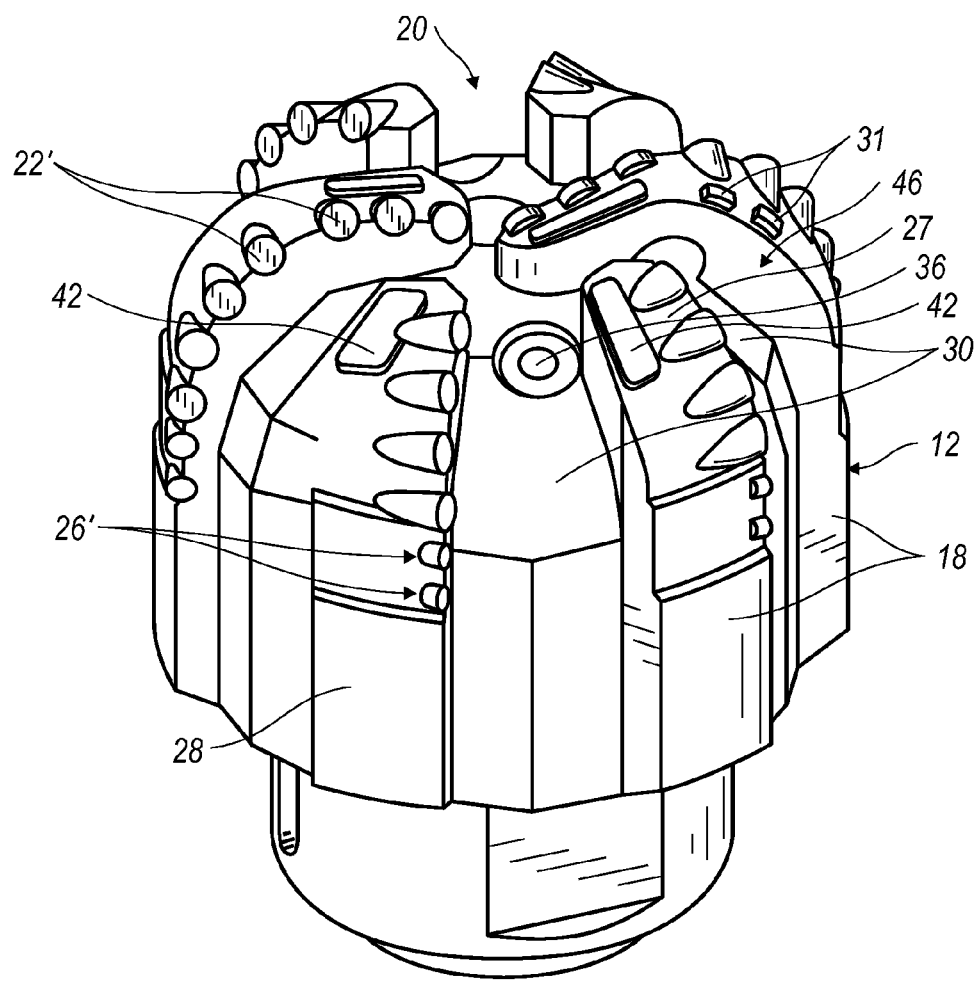
FIG. 3 is an inverted perspective view of an exemplary three-dimensional fixed-cutter bit body model including bit body elements according to another embodiment.

FIG. 3 is an inverted perspective view of an exemplary three-dimensional fixed-cutter bit body model 12 including bit body elements according to another embodiment. Bit body elements including, but not limited to, cutting elements 22', nozzles 36, gage trimmers 26', bearing elements 42, cutting control structures 31, and other bit body elements know in the art may be positioned at the external periphery of the bit body model 12 before mold material is applied. Cutting elements 22' are positioned at the external periphery of the bit body model 12 along the leading peripheral edge 27 of each blade 18 proximate the distal end 20 of the bit body model 12. A plurality of rows of cutting elements 22' may be positioned along the leading peripheral edge 27 of each blade 18 proximate the distal end 20 of the bit body model 12. Nozzles 36 are positioned at the external periphery of the bit body model 12 within the junk slots 30. Gage trimmers 26' are positioned at the external periphery of the bit body model 12 immediately adjacent and above the gage pads 28. Bearing elements 42 are positioned at the external periphery of the bit body model 12 on the blades 18. Cutting control structures 31 including splitters, breakers, diverters, and/or wedges may be positioned at the external periphery of the bit body model 12 proximate the cutting elements 22' and along the leading side wall 46 of the junk slots 30. The bit body model 12 including bit body elements may be used to fabricate a bit body mold.

Figure 4A:
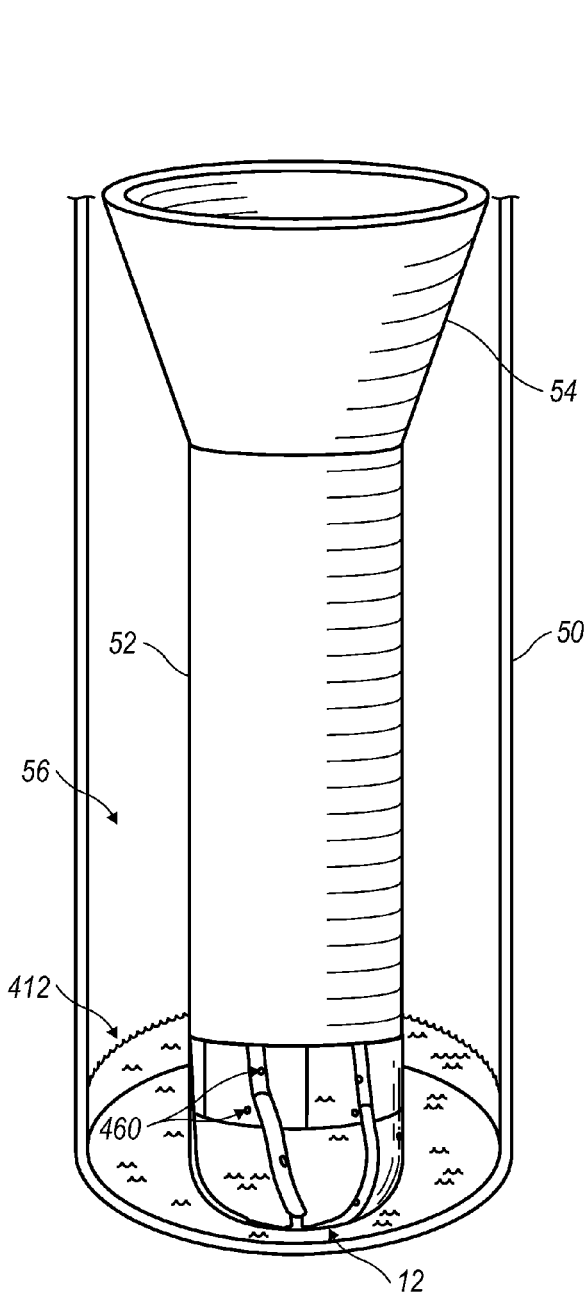
FIGS. 4A through 4C illustrate an exemplary system and method for fabricating a bit body mold from a bit body model and casting a composite matrix material within the bit body mold according to one embodiment.
Figure 4B:
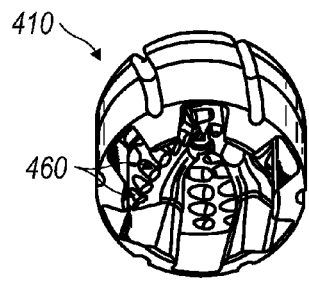
Figure 4C:
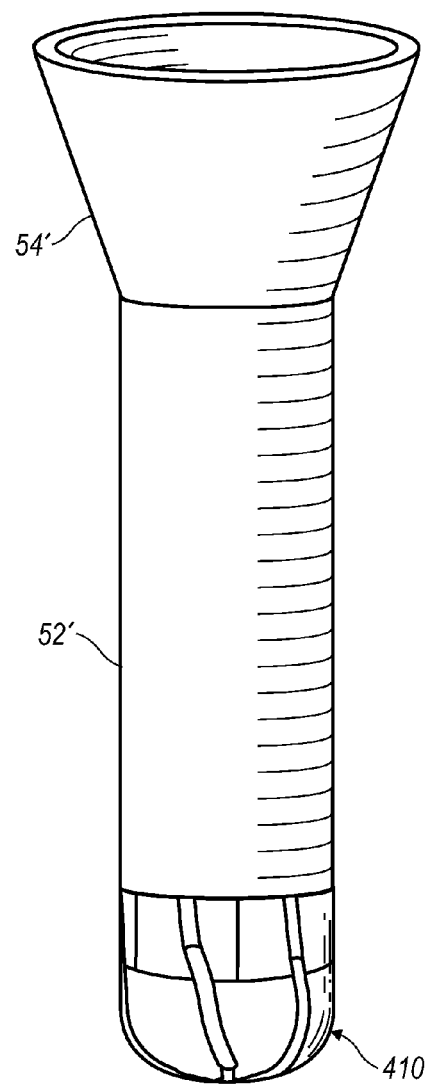

FIGS. 4A through 4C illustrate an exemplary system and method for fabricating a bit body mold 410 from a bit body model 12 and casting a composite matrix material within the mold 410 according to one embodiment. The bit body model 12 may be fabricated using three-dimensional modeling systems and layered manufacturing processes herein disclosed. The bit body model 12 may also be fabricated by hand. The bit body model 12 may be constructed from material such as wax, polymer, or combinations thereof. A down sprue 52 and sprue cup 54 are secured to the bit body model 12 to create a mold assembly 56. The down sprue 52 and sprue cup 54 may be constructed from material such as wax, polymer, or combinations thereof. The down sprue 52 and sprue cup 54 may be constructed from the same material as the bit body model 12 or from a dissimilar material.

Bit body elements 460 including, but not limited to, cutting elements, nozzles, gage trimmers, bearing elements, and cutting control structures may be positioned at the external periphery of the bit body model 12 before mold material 412 is applied to the bit body model 12 and at least a portion of the bit body elements 460. Bit body elements 460 may be manufactured from one or more materials including, but not limited to, monotungsten carbide (WC), ditungsten carbide ($W_2C$), macro-crystalline tungsten carbide, cobalt, titanium carbide, tantalum carbide, metal borides, metal oxides, metal nitrides, polycrystalline diamond compact (PDC), thermally stable polycrystalline diamond (TSP), cubic boron nitride (CBN), polycrystalline cubic boron nitride (PCBN), tungsten, iron, nickel, titanium, and boron carbide.

Mold material 412 may be applied to the mold assembly 56 by submerging the mold assembly 56 in a flask 50 containing mold material 412. Mold material 412 may comprise ceramic, sand, graphite, clay, plastic, rubber, wax, and/or other refractory materials known in the art for fabricating downhole tool molds.

In an example embodiment, the mold material 412 is a ceramic slurry comprising zirconium silicate ($ZrSiO_4$), water, and alcohol. The mold assembly 56 may be submerged in the mold material 412 a plurality of times. Prior to each submersion, the previous layer of mold material 412 may be permitted to cure or substantially harden. Mold material 412 may be cured or substantially hardened at ambient temperature or at an increased temperature. Curing may be facilitated with an air blower or by baking the resulting mold 410 in an oven.

In an example embodiment, at least one first internal layer of ceramic slurry mold material 412 is applied to the external periphery of the bit body model 12 to ensure a proper surface finish of the mold 410. Additional layers of mold material 412 including, but not limited to, ceramic, sand, graphite, clay, plastic, rubber, wax, or refractory material may be applied on top of at least one layer of ceramic slurry mold material 412 to finish and strengthen the mold 410 for handling.

Mold material 412 may be applied to external periphery of the mold assembly 56 in several ways including, but not limited to, spraying mold material 412 on the external periphery of the mold assembly 56, placing the mold assembly 56 into a container and pouring mold material 412 on the external periphery of the mold assembly 56, applying mold material 412 to the external periphery of the mold assembly 56 in paste form, or blowing mold material 412 on the external periphery of the mold assembly 56.

After a sufficient quantity of mold material 412 (e.g., a one-half inch layer of mold material 412) is applied to the external periphery of the mold assembly 56 including the down sprue 52, the sprue cup 54, and the bit body model 12, the mold material 412 and mold assembly 56 are heated to a temperature sufficient to cure or substantially harden the mold material 412 and melt, burn, and/or vaporize the mold assembly 56 from within the mold 410. The bit body elements 460 are retained within the mold 410 (shown in FIG. 4B) after the mold assembly 56 (shown in FIG. 4A) is melted, burned, and/or vaporized from within the mold 410. The mold assembly 56 may also be dissolved with a dissolving composition.

Referring to FIG. 4C, after the mold assembly 56 (shown in FIG. 4A) is melted, burned, vaporized, or dissolved from within the mold 410, the remaining structure includes the mold 410, a down sprue 52', and sprue cup 54' formed from mold material. A composite matrix material in powder form may be placed within the sprue cup 54', the down sprue 52', and the mold 410. The composite matrix material is heated to a temperature sufficient to melt the composite matrix material. The composite matrix material flows down the down sprue 52' and into the mold 410. The composite matrix material hardens within the mold 410 to form a metallurgical bond with the bit body elements 460 (shown in FIG. 4B). The mold 410 may be removed from the cast hardened composite matrix material to produce a finished fixed cutter drill bit body.

The composite matrix material may be cast within the mold 410 under vacuum conditions in a vacuum furnace. The composite matrix material may be also cast within the mold 410 in the presence of a protective atmosphere, such as an inert atmosphere including argon or a reducing atmosphere including hydrogen, methane, and/or other gaseous hydrocarbons that scavenge oxygen. It is also contemplated that the composite matrix material may be cast within the mold 410 in air after applying a protective coating over the composite matrix material. The protective coating may comprise silicon oxide, boron oxide, calcium oxide, or zinc oxide.

Figure 5A:
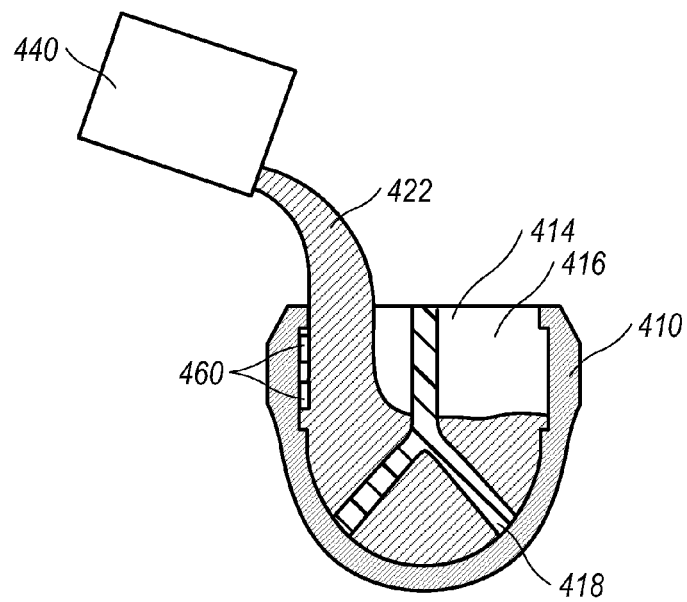
FIGS. 5A through 5C illustrate an exemplary system and method for casting a composite matrix material within a bit body mold according to another embodiment.
Figure 5B:
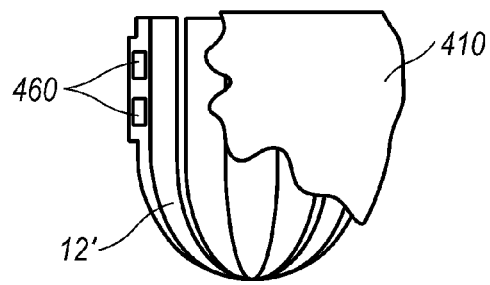
Figure 5C:
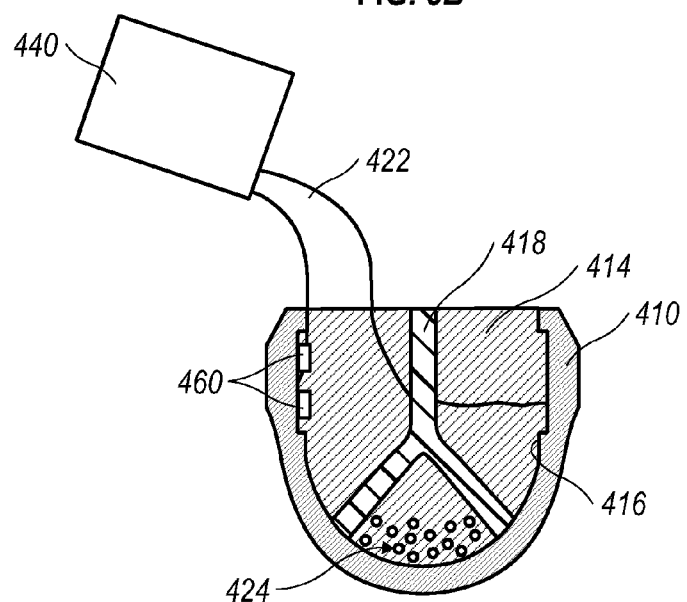

FIGS. 5A through 5C illustrate an exemplary system and method for casting a composite matrix material within a bit body mold 410 according to another embodiment. Bit body elements 460, including, but not limited to, cutting elements, nozzles, gage trimmers, bearing elements, cutting control structures, and/or other bit body elements known in the art, are retained within a fixed cutter bit body mold 410 after a bit body model (e.g., bit body model 12 (FIG. 4I)) is melted, burned, vaporized, or dissolved from within the mold 410. The bit body mold 410 is used to manufacture a fixed cutter bit body 12' by casting a composite matrix material 422 within the bit body mold 410 and over at least a portion of the bit body elements 460. It is also contemplated that bit body elements 460 may be positioned directly within the mold 410 before the mold 410 is permitted to fully cure and after the bit body model 12 is melted, burned, vaporized, or dissolved.

Bit body elements 460, including cutting elements, nozzles, gage trimmers, bearing elements, cutting control structures, and/or other bit body elements known in the art, may be fabricated from one or more materials including, but not limited to, monotungsten carbide (WC), ditungsten carbide ($W_2C$), macro-crystalline tungsten carbide, cobalt, titanium carbide, tantalum carbide, metal borides, metal oxides, metal nitrides, polycrystalline diamond compact (PDC), thermally stable polycrystalline diamond (TSP), cubic boron nitride (CBN), polycrystalline cubic boron nitride (PCBN), tungsten, iron, nickel, titanium, and boron carbide.

In an example embodiment, bit body elements 460 are fabricated from sintered tungsten carbide (tungsten carbide and cobalt). To ensure adequate wear resistance of the sintered tungsten carbide bit body elements 460, the cobalt content is less than 20 weight percent. After the composite matrix material 422 is cast and permitted to harden, a metallurgical bond is formed between the composite matrix material 422 and the sintered tungsten carbide bit body elements 460. The sintered tungsten carbide bit body elements 460 retain their mechanical properties within the finished drill bit body 12'.

During casting, the mold 410 may be disposed in a support structure, a mold casing, or a pliable vessel filled with support material such as sand to prevent damage to the mold 410 and composite matrix material 422 cast therein. Mold inserts 418 that define the external geometry of the bit body 12' may be inserted through an opening 414 and arranged in the cavity 416 of the mold 410 to support the mold 410 during casting.

A composite matrix material 422 comprising two or more constituents that form a single miscible liquid mixture of all constituents at or above the eutectic temperature of the composite matrix material is cast within the mold 410. The composite matrix material 422 may be poured in liquid or molten form into the cavity 416 of the mold 410 from any suitable container 440 such as a crucible or ladle that will not degrade during casting. The composite matrix material 422 may comprise two or more constituents including, but not limited to, monotungsten carbide (WC), ditungsten carbide ($W_2C$), cobalt, tungsten, iron, nickel, titanium, and boron carbide. The mold 410 is removed from the cast hardened composite matrix material 422 to produce a finished drill bit body 12'.

Figure 7:
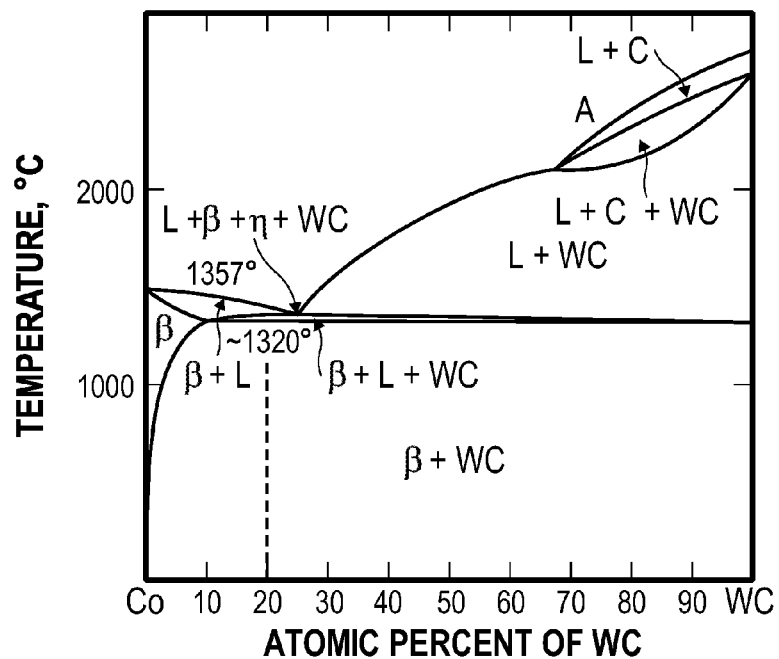
FIG. 7 illustrates a phase diagram of an exemplary composite matrix material for casting downhole tools and tools parts in accordance with the present disclosure.

FIG. 7 illustrates a phase diagram of an exemplary composite matrix material for casting downhole tools and tools parts in accordance with the present disclosure. The composite matrix material comprises monotungsten carbide and cobalt. The X-axis of the phase diagram represents the relative concentrations of monotungsten carbide and cobalt in terms of the monotungsten carbide atomic percent. The Y-axis represents the temperature of the composite matrix material in terms of degrees Celsius. The eutectic point represents the minimum melting temperature of the composite matrix material and is the point at which a single miscible liquid phase (A) comprising a mixture of monotungsten carbide and cobalt is formed. L represents a multi-component liquid phase, β represents a solid phase of tungsten, WC represents a solid phase of tungsten carbide, and η represents a ternary phase of $Co_3W_3C$. The eutectic temperature of the composite matrix material is about 1357° C. The eutectic point is depicted on the phase diagram at a monotungsten carbide content of about 25 atomic percent (cobalt content of about 75 atomic percent) and a temperature of about 1357° C.

It is advantageous to cast the downhole tool or tool part with the composite matrix material in the liquid phase (A) when a single miscible liquid mixture of monotungsten carbide and cobalt is formed. Liquid phase (A) casting ensures that the composite matrix material flows to the edge of the mold, resulting in a downhole tool or tool part with full and uniform density. Casting the downhole tool or tool part with a composite matrix material at or near the eutectic composition facilitates liquid phase (A) casting at lower processing temperatures (e.g. 1357° C. to 1500° C.) without the need for melting point depressing additives.

As illustrated in the phase diagram, the composite matrix material is in the liquid phase (A) at relatively low processing temperatures (e.g., between about 1357° C. and 1500° C.) when the cobalt content of the composite matrix material is equal to or greater than about 70 atomic percent. Once the composite matrix material hardens, the monotungsten carbide (WC) and cobalt separate into individual constituents to form a continuous cobalt phase and a particulate phase of monotungsten carbide (WC) grains dispersed throughout.

Referring to FIGS. 5A through 5C, a composite matrix material 422 comprising monotungsten carbide (WC) and cobalt may be cast in molten or liquid form within the cavity 416 of the mold 410 and over at least a portion of the bit body elements 460 retained within the mold 410. Mold inserts 418 that define the external geometry of the bit body 12' may be inserted through an opening 414 and arranged in the cavity 416 of the mold 410 to support the mold 410 during casting. The composite matrix material 422 may be poured into the cavity 416 of the mold 410 and over a portion of the bit body elements 460 from a container 440 such as a crucible or ladle that will not degrade during casting. The composite matrix material 422 may be cast at the eutectic composition to achieve liquid phase casting at the lowest melting temperature of the composite matrix material 422. The composite matrix material 422 may also be super heated to a temperature substantially above the eutectic temperature to decrease the viscosity of the composite matrix material 422 and to ensure that the composite matrix material 422 remains in the liquid phase to cover all surfaces of the mold 410 during casting.

The composite matrix material 422 may be cast within the cavity 416 of the mold 410 under vacuum conditions in a vacuum furnace. The composite matrix material 422 may be cast within the cavity 416 of the mold 410 in the presence of a protective atmosphere, such as an inert atmosphere including argon or a reducing atmosphere including hydrogen, methane, and/or other gaseous hydrocarbons that scavenge oxygen. It is also contemplated that the composite matrix material 422 may be cast within the cavity 416 of the mold 410 in air after applying a protective coating over the composite matrix material 422. The protective coating may comprise silicon oxide, boron oxide, calcium oxide, or zinc oxide. The composite matrix material 422 may be permitted to harden at ambient temperature, at an increased temperature, in open air, or in a protective atmosphere. Once the composite matrix material 422 hardens, the mold 410 may be removed from the cast hardened composite matrix material 422 to produce a finished drill bit body 12'.

Referring to FIG. 5C, a particulate material 424 may be selectively dispersed within the mold cavity 416. The composite matrix material 422 is infiltration cast into the selectively dispersed particulate material 424 within the mold cavity 416 to increase the strength, wear resistance, or toughness of select surfaces of the finished bit body 12' (shown in FIG. 5B). Particulate material 424 may comprise one or more constituents including, but not limited to, monotungsten carbide (WC), ditungsten carbide ($W_2C$), macro-crystalline tungsten carbide, cobalt, titanium carbide, tantalum carbide, metal borides, metal oxides, metal nitrides, polycrystalline diamond compact (PDC), thermally stable polycrystalline diamond (TSP), cubic boron nitride (CBN), polycrystalline cubic boron nitride (PCBN), tungsten, iron, nickel, titanium, and boron carbide.

The particulate material 424 may be evenly dispersed throughout the cavity 416 of the mold 410 before the composite matrix material 422 is infiltration cast within the cavity 416. More than one bed of particulate material 424 comprising one or more dissimilar constituents may also be dispersed throughout the cavity 416 of the mold 410 before the composite matrix material 422 is infiltration cast within the cavity 416. The strength, wear resistance, or toughness of select surfaces of the finished bit body 12' may be optimized by varying the composition and location of the particulate material 424 within the cavity 416 of the mold 410.

In an example embodiment, the particulate material 424 comprises tungsten carbide and cobalt. The cobalt content of the particulate material 424 is less than 20 weight percent to ensure sufficient wear resistance of select surfaces of the finished bit body 12' (shown in FIG. 5B).

Figure 6A:
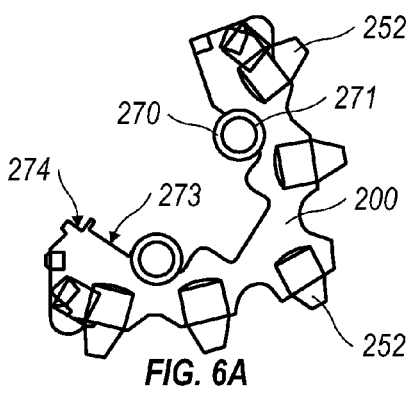
FIGS. 6A through 6E illustrate exemplary systems and methods for fabricating a roller cone mold from a roller cone model and casting a composite matrix material within the roller cone mold according to one embodiment.

FIGS. 6A through 6E illustrate exemplary systems and methods for fabricating a roller cone mold 210 from a roller cone model 200 and casting a composite matrix material within the roller cone mold 210 according to one embodiment. Referring to FIG. 6A, a cross sectional view of an exemplary three-dimensional roller cone model 200 is illustrated. The roller cone model 200 may be fabricated by using three-dimensional modeling systems and layered manufacturing processes herein disclosed. The roller cone model 200 may also be fabricated by hand. A plurality of cutting inserts 252 may be positioned at the external periphery of the roller cone model 200. The cutting inserts 252 may be fabricated from one or more materials including, but not limited to, monotungsten carbide (WC), ditungsten carbide ($W_2C$), macro-crystalline tungsten carbide, cobalt, titanium carbide, tantalum carbide, metal borides, metal oxides, metal nitrides, polycrystalline diamond compact (PDC), thermally stable polycrystalline diamond (TSP), cubic boron nitride (CBN), polycrystalline cubic boron nitride (PCBN), tungsten, iron, nickel, titanium, and boron carbide.

In an example embodiment, cutting inserts 252 are fabricated from sintered tungsten carbide. To ensure adequate wear resistance of the cutting inserts 252, the cobalt content of the cutting inserts 252 is less than 20 weight percent.

Bearing elements including, but not limited to, an outer ball race 270 and an inner ball race 271 may be positioned within the roller cone model 200 for subsequent insertion of a bearing. Retaining impressions 273, 274 may also be formed in the roller cone model 200 during fabrication of the roller cone model 200. Retaining impressions 273, 274 may be designed to retain bearing elements including, but not limited to, tubular bushing inserts, resilient energizer rings, and pilot pins. The roller cone model 200 may be used to fabricate a roller cone mold 210 (shown in FIG. 6C).

Figure 6B:
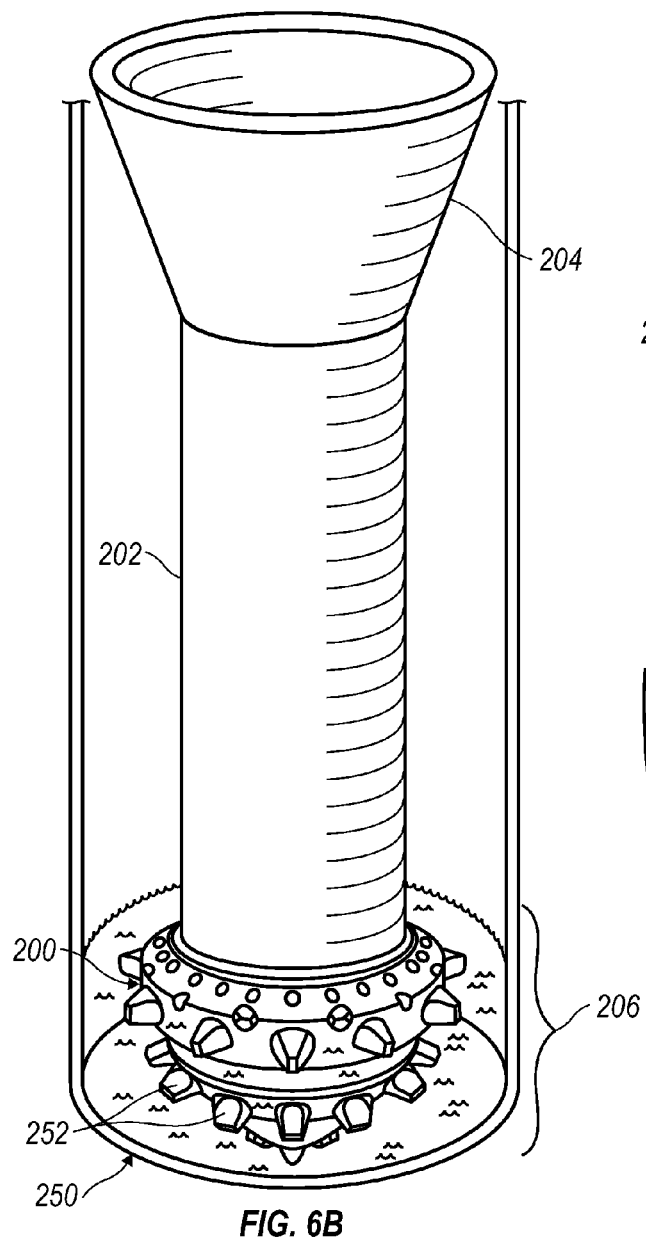

Referring to FIG. 6B, a perspective view of an exemplary mold assembly 206 is illustrated. The roller cone model 200 may be constructed from material such as wax, polymer, or combinations thereof. A down sprue 202 and sprue cup 204 are secured to the roller cone model 200 to create a mold assembly 206. The down sprue 202 and sprue cup 204 are constructed from material such as wax, polymer, or combinations thereof. The down sprue 202 and sprue cup 204 may be constructed from the same material as the roller cone model 200 or from a dissimilar material. Mold material may be applied to the external periphery of the mold assembly 206 by submerging the mold assembly 206 in a flask 250 containing mold material. The mold material may comprise ceramic, sand, graphite, clay, plastic, rubber, wax, and/or other refractory materials known in the art for fabricating downhole tool molds.

In an example embodiment, the mold material is a ceramic slurry comprising zirconium silicate ($ZrSiO_4$), water, and alcohol. The mold assembly 206 is submerged in the mold material a plurality of times. Prior to each submersion, the previous layer of mold material may be permitted to cure or substantially harden. Mold material may be cured or substantially hardened at ambient temperature or at an increased temperature. Other mold material such as sand may be added on top of the ceramic slurry layer to improve mold assembly 206 strength for handling.

Figure 6C:
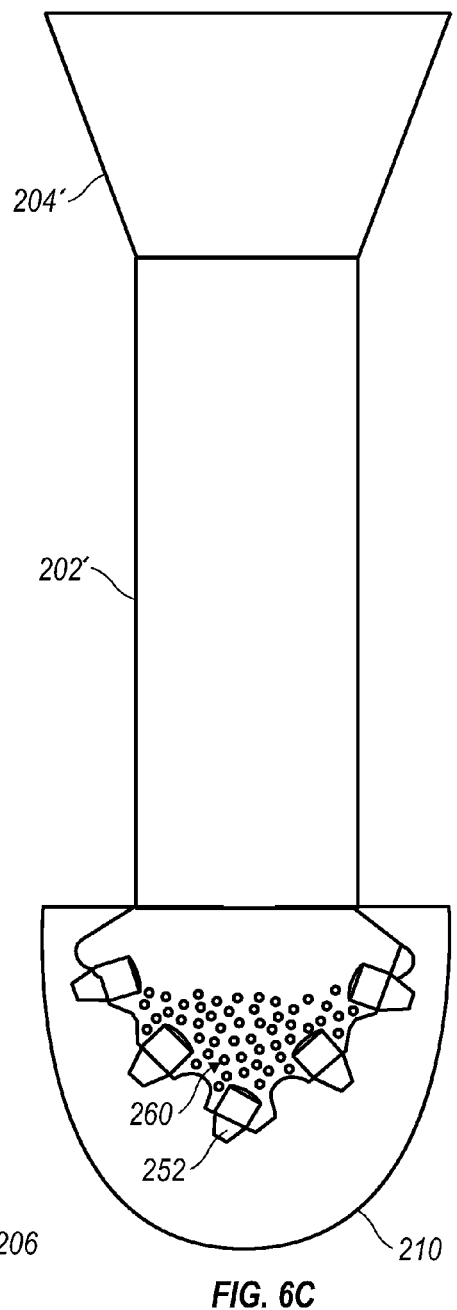

In an example embodiment, at least one first internal layer of ceramic slurry mold material is applied to the external periphery of the roller cone model 200 to ensure a proper surface finish of the roller cone mold 210 (shown in FIG. 6C). Additional layers of mold material including, but not limited to, ceramic, sand, graphite, clay, plastic, rubber, wax, or refractory material may be applied on top of at least one layer of ceramic slurry mold material to finish and strengthen the roller cone mold 210 for handling.

Mold material may be applied to the external periphery of the mold assembly 206 in several ways including, but not limited to, spraying mold material on the external periphery of the mold assembly 206, placing the mold assembly 206 into a container and pouring mold material on the external periphery of the mold assembly 206, applying mold material in paste form to the external periphery of the mold assembly 206, or blowing mold material on the external periphery of the mold assembly 206.

After a sufficient quantity of mold material (e.g., one-half inch layer of mold material) is applied to the mold assembly 206, the mold material and mold assembly 206 are heated to a temperature sufficient to cure or substantially harden the mold material and melt, burn, and/or vaporize the mold assembly 206 from within the roller cone mold 210 (shown in FIG. 6C). The mold assembly 206 may also be dissolved with a dissolving composition. Cutting inserts 252 and bearing elements including the outer ball race 270 and the inner ball race 271 (shown in FIG. 6A) are retained within the roller cone mold 210 after the mold assembly 206 (shown in FIG. 6B) is melted, burned, vaporized, or dissolved from within the roller cone mold 210 (shown in FIG. 6C).

Referring to FIG. 6C, a cross-sectional view of an exemplary roller cone mold 210 is illustrated. After the mold assembly 206 (shown in FIG. 6B) is melted, burned, vaporized, or dissolved from within the roller cone mold 210, the remaining structure includes the roller cone mold 210, a down sprue 202', and a sprue cup 204' formed from mold material. A composite matrix material in powder form may be placed within the down sprue 202', the sprue cup 204', and the roller cone mold 210. The composite matrix material is heated to a temperature sufficient to melt the composite matrix material. The composite matrix material flows down the down sprue 202' and into the roller cone mold 210. The composite matrix material hardens within the roller cone mold 210 to form a metallurgical bond with the cutting inserts 252 and bearing elements including the outer ball race 270 and the inner ball race 271 (shown in FIG. 6A) retained within the roller cone mold 210. The roller cone mold 210 may be removed from the cast hardened composite matrix material to produce a finished roller cone 200' including cutting inserts 252 (shown in FIG. 6E) and bearing elements (shown in FIG. 6A).

The composite matrix material comprises two or more constituents that form a single miscible liquid mixture of all constituents at or above the eutectic temperature of the composite matrix material. The composite matrix material may comprise two or more constituents including, but not limited to, monotungsten carbide (WC), ditungsten carbide ($W_2C$), cobalt, tungsten, iron, nickel, titanium, and boron carbide. In an example embodiment, the composite matrix material comprises monotungsten carbide (WC) and cobalt.

In an example embodiment, a particulate material 260 is selectively dispersed within the roller cone mold 210. The composite matrix material is infiltration cast within the roller cone mold 210 containing the selectively dispersed particulate material 260 to increase the strength, wear resistance, or toughness of select surfaces of the finished roller cone 200' (shown in FIG. 6E). Particulate material 260 may comprise one or more constituents including, but not limited to, monotungsten carbide (WC), ditungsten carbide (W$_2$C), macro-crystalline tungsten carbide, cobalt, titanium carbide, tantalum carbide, metal borides, metal oxides, metal nitrides, polycrystalline diamond compact (PDC), thermally stable polycrystalline diamond (TSP), cubic boron nitride (CBN), polycrystalline cubic boron nitride (PCBN), tungsten, iron, nickel, titanium, and boron carbide.

The composite matrix material may be cast within the roller cone mold 210 under vacuum conditions in a vacuum furnace. The composite matrix material may also be cast within the roller cone mold 210 in the presence of a protective atmosphere, such as an inert atmosphere including argon or a reducing atmosphere including hydrogen, methane, and/or other gaseous hydrocarbons that scavenge oxygen. It is also contemplated that the composite matrix material may be cast within the roller cone mold 210 in air after applying a protective coating over the composite matrix material. The protective coating may comprise silicon oxide, boron oxide, calcium oxide, or zinc oxide.

Figure 6D:
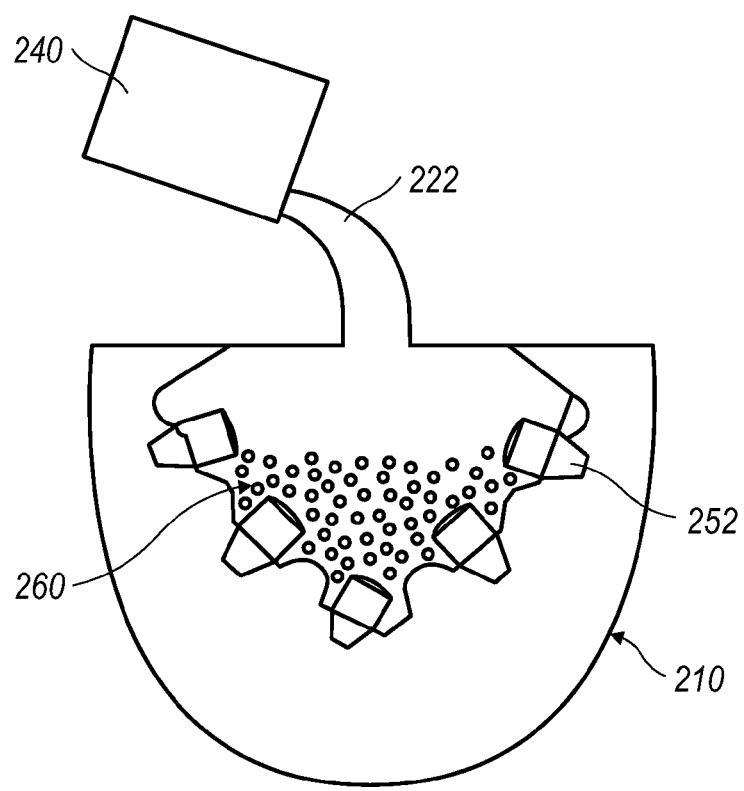
Figure 6E:
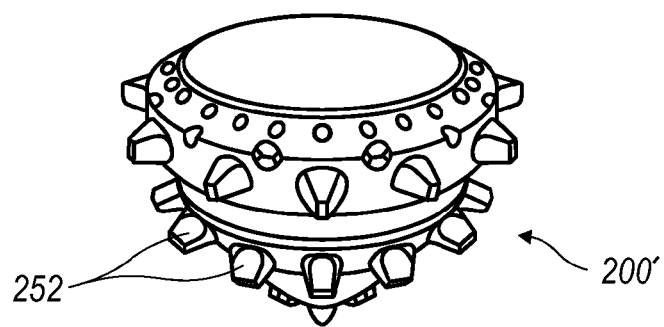

Referring to FIG. 6D, a cross sectional view of another example embodiment of a roller cone mold 210 is illustrated. The roller cone mold 210 is manufactured by applying mold material to the external periphery of a roller cone model 200 (shown in FIG. 6B) and at least a portion of cutting inserts 252 positioned therein (shown in FIG. 6B). The roller cone model 200 (shown in FIG. 6B) is eliminated from within the roller cone mold 210 by melting, burning, vaporizing, or dissolving the roller cone model 200. Cutting inserts 252 are retained within the roller cone mold 210 after the roller cone model 200 is melted, burned, vaporized, or dissolved from within the roller cone mold 210. It is also contemplated that cutting inserts 252 may be positioned directly within the roller cone mold 210 before the roller cone mold 210 fully cures and after the roller cone model 200 (shown in FIG. 6B) is melted, burned, vaporized, or dissolved.

Composite matrix material 222 may be cast directly into the roller cone mold 210 and about a portion of cutting inserts 252 by pouring the composite matrix material 222 in molten or liquid form directly into the roller cone mold 210. The composite matrix material 222 is poured directly into the roller cone mold 210 in molten or liquid form through a container 240 such as a crucible or ladle that will not degrade during casting. The composite matrix material 222 hardens within the roller cone mold 210 to form a metallurgical bond with cutting inserts 252 retained within the roller cone mold 210. The roller cone mold 210 may be removed from the cast hardened composite matrix material 222 to produce a finished roller cone 200' (shown in FIG. 6E). The cutting inserts 252 retain their mechanical properties within the finished roller cone 200' (shown in FIG. 6E).

The composite matrix material 222 comprises two or more constituents that form a single miscible liquid mixture of all constituents at or above the eutectic temperature of the composite matrix material 222. The composite matrix material 222 may comprise two or more constituents including, but not limited to, monotungsten carbide (WC), ditungsten carbide (W$_2$C), cobalt, tungsten, iron, nickel, titanium, and boron carbide. In an example embodiment, the composite matrix material 222 comprises monotungsten carbide (WC) and cobalt.

The composite matrix material 222 may be cast within the roller cone mold 210 under vacuum conditions in a vacuum furnace. The composite matrix material 222 may also be cast within the roller cone mold 210 in the presence of a protective atmosphere, such as an inert atmosphere including argon or a reducing atmosphere including hydrogen, methane, and/or other gaseous hydrocarbons that scavenge oxygen. It is also contemplated that the composite matrix material 222 may be cast within the roller cone mold 210 in air after applying a protective coating over the composite matrix material 222. The protective coating may comprise silicon oxide, boron oxide, calcium oxide, or zinc oxide.

In an example embodiment, a particulate material 260 is selectively dispersed within the roller cone mold 210. The composite matrix material 222 is infiltration cast within the roller cone mold 210 containing the selectively dispersed particulate material 260 to increase the strength, wear resistance, or toughness of select surfaces of the finished roller cone 200' (shown in FIG. 6E). Particulate material 260 may comprise one or more constituents including, but not limited to, monotungsten carbide (WC), ditungsten carbide (W$_2$C), macro-crystalline tungsten carbide, cobalt, titanium carbide, tantalum carbide, metal borides, metal oxides, metal nitrides, polycrystalline diamond compact (PDC), thermally stable polycrystalline diamond (TSP), cubic boron nitride (CBN), polycrystalline cubic boron nitride (PCBN), tungsten, iron, nickel, titanium, and boron carbide.

The particulate material 260 may be evenly dispersed throughout the roller cone mold 210 before the composite matrix material 222 is infiltration cast within the roller cone mold 210. More than one bed of particulate material 260 comprising one or more dissimilar constituents may be dispersed throughout the roller cone mold 210 before the composite matrix material 222 is infiltration cast within the roller cone mold 210. The strength, wear resistance, or toughness of select surfaces of the finished roller cone 200' (shown in FIG. 6E) may be optimized by varying the composition and location of the particulate material 260 within the roller cone mold 210.

In an example embodiment, the particulate material 260 comprises tungsten carbide and cobalt. The cobalt content of the particulate material 260 is less than 20 weight percent to ensure sufficient wear resistance of select surfaces of the finished roller cone 200' (shown in FIG. 6E).

FIGS. 8A through 8D illustrate microstructures formed from casting a composite matrix material in accordance with the present disclosure. A composite matrix material comprising monotungsten carbide (WC) and cobalt was cast within a container. The casting was performed under vacuum conditions in a vacuum furnace to reduce the possibility of air pockets and protect the composite matrix material from oxidation.

Figure 8A:
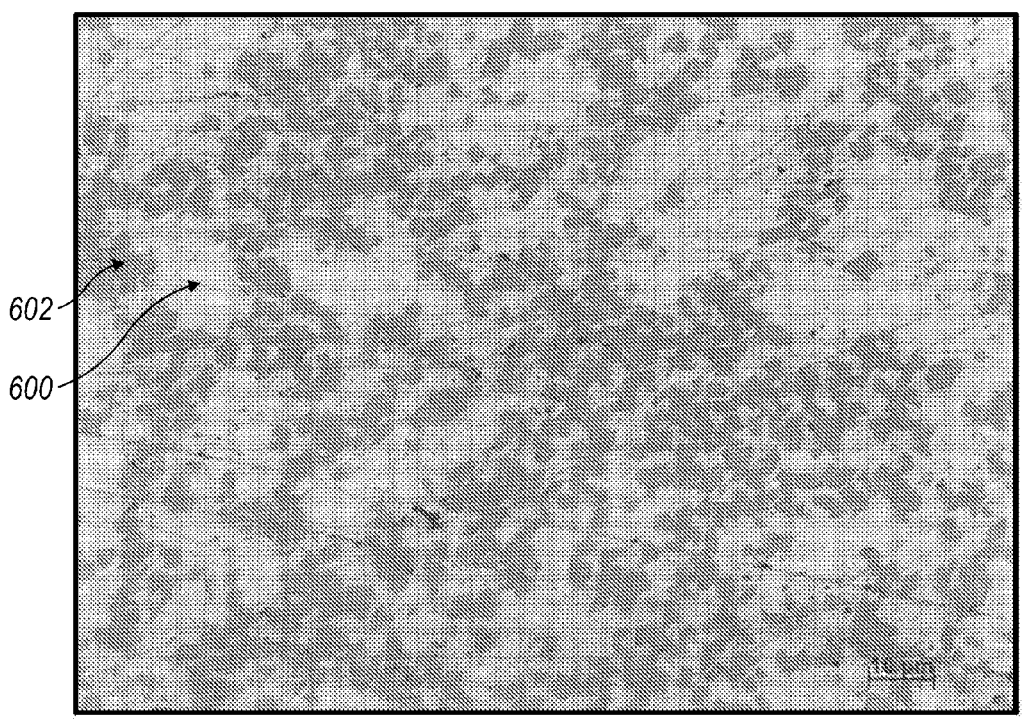
FIGS. 8A through 8D illustrate microstructures formed from casting a composite matrix material in accordance with the present disclosure.

Referring to FIG. 8A, a composite matrix material comprising a monotungsten carbide content of 25 atomic percent and a cobalt content of 75 atomic percent was cast in aluminum oxide (Al$_2$O$_3$) and zirconium oxide (ZrO$_2$) crucibles including an external layer of painted zirconium silicate (ZrSiO$_4$). The composite matrix material formed an ingot after being cast into the crucibles at temperatures ranging from 1357° C. to 1500° C. with hold times between 15 minutes and 120 minutes. The resulting microstructure includes a continuous phase 600 of cobalt and a selectively dispersed particulate phase 602 of evenly dispersed monotungsten carbide particles.

Figure 8B:
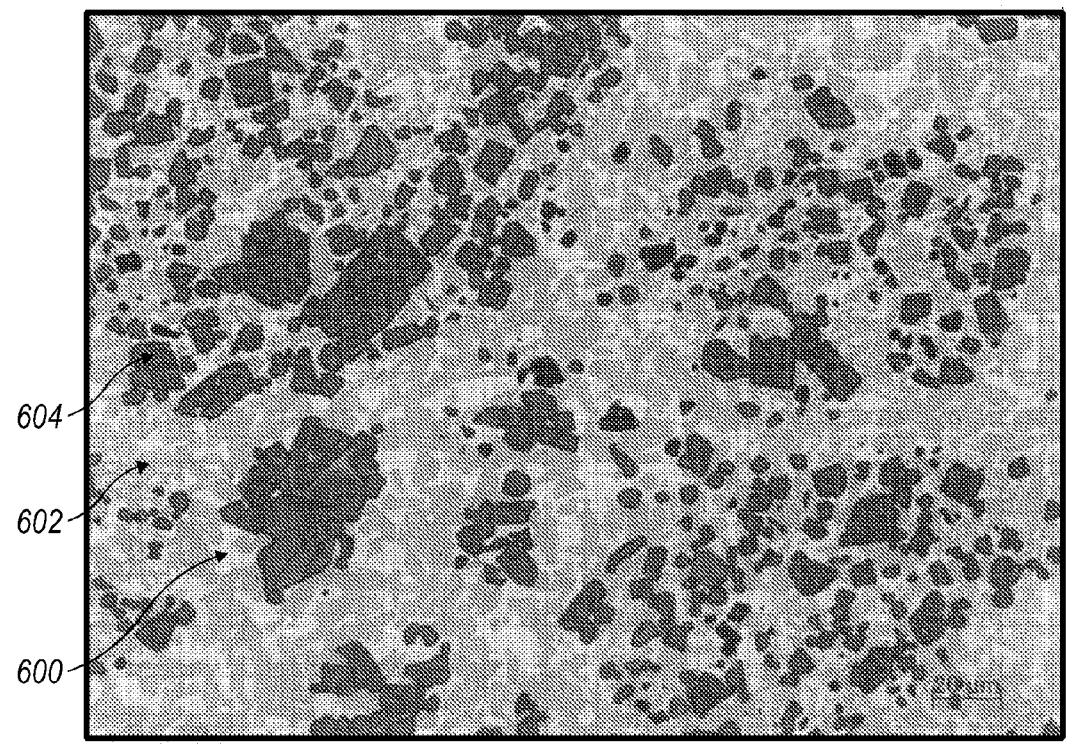

Referring to FIG. 8B, a composite matrix material comprising a monotungsten carbide content of 25 atomic percent and a cobalt content of 75 atomic percent was infiltration cast into a bed of monotungsten carbide (WC) (MACROLINE®, spherical, and crushed cast) in aluminum oxide ($Al_2O_3$) and zirconium oxide ($ZrO_2$) crucibles including an external layer of painted zirconium silicate ($ZrSiO_4$). The composite matrix material was infiltration cast at a temperature of 1500° C. with a 120 minute hold time to enable adequate infiltration. The resulting microstructure includes a continuous phase 600 of cobalt with a selectively dispersed particulate phase 602 of monotungsten carbide particles and a sub-stoiciometric phase 604. The sub-stoiciometric phase 604 is characterized by the following chemical formula: $M_xC$, where M is cobalt or tungsten (W), C is carbide, and x is a number between 1 and 6.

Figure 8C:
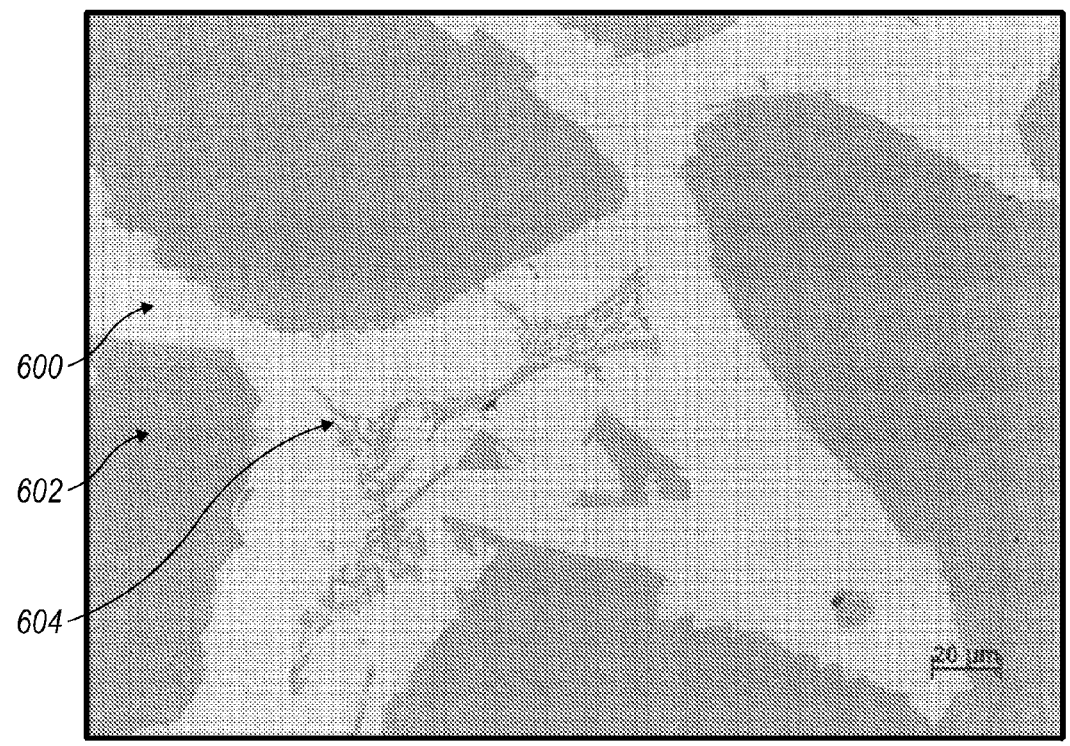

Referring to FIG. 8C, a composite matrix material comprising a monotungsten carbide content of 25 atomic percent and a cobalt content of 75 atomic percent was infiltration cast into a bed of macro-crystalline tungsten carbide in aluminum oxide ($Al_2O_3$) and zirconium oxide ($ZrO_2$) crucibles including an external layer of painted zirconium silicate ($ZrSiO_4$). The composite matrix material was infiltration cast at a temperature of 1500° C. with a 120 minute hold time to enable adequate infiltration. The resulting microstructure includes a continuous phase 600 of cobalt, a selectively dispersed particulate phase 602 of macro-crystalline tungsten carbide particles, and a eutectic particulate phase 604 comprising a eutectic composition of cobalt and monotungsten carbide particles.

Figure 8D:
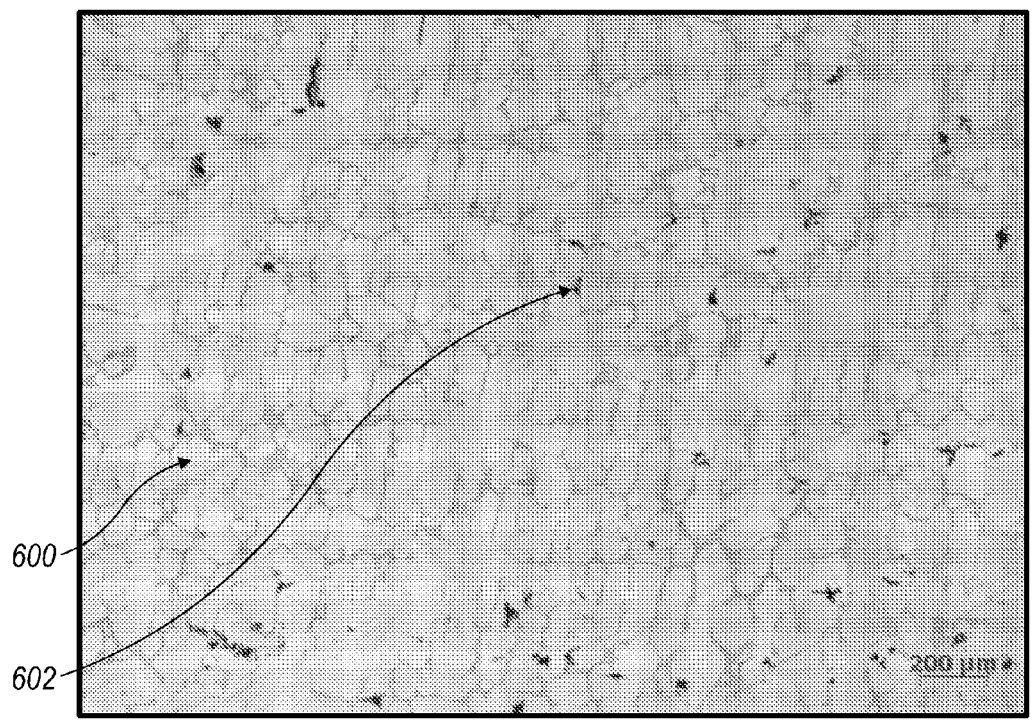

Referring to FIG. 8D, a composite matrix material comprising a monotungsten carbide content of 25 atomic percent and a cobalt content of 75 atomic percent was infiltration cast into a bed of macro-crystalline tungsten carbide in aluminum oxide ($Al_2O_3$) and zirconium oxide ($ZrO_2$) crucibles including an external layer of painted zirconium silicate ($ZrSiO_4$). The composite matrix material was infiltration cast at a temperature of 1500° C. with a 120 minute hold time to enable adequate infiltration. The resulting microstructure includes a continuous phase 600 of cobalt and a selectively dispersed particulate phase 602 of macro-crystalline tungsten carbide particles.

The methods, systems, and compositions herein disclosed for manufacturing downhole tools and tool parts are not limited to manufacturing roller cones and fixed-cutter bit bodies. The methods, systems, and compositions herein disclosed can be used to manufacture downhole tool parts and tools such as casing bits, reamers, bi-center rotary drill bits, reamer wings, down-hole milling tools, bi-center drill bits, well-completion equipment, and/or other drilling tools known in the art for drilling subterranean material and/or completing subterranean wells.

Example embodiments have been described hereinabove regarding improved methods, systems, and compositions for manufacturing downhole tools. Various modifications to and departures from the disclosed example embodiments will occur to those having skill in the art. The subject matter that is intended to be within the spirit of this disclosure is set forth in the following claims.

What is claimed is:

1. A downhole tool part for drilling subterranean material, the downhole tool part having a composition comprising:
    a continuous composite matrix material comprising a eutectic or near eutectic composition, the eutectic or near eutectic composition comprising a carbide and at least one of cobalt, iron, and nickel; and
    a particulate material dispersed within the continuous composite matrix material, the particulate material comprising at least one constituent selected from the group consisting of: polycrystalline diamond compact (PDC), thermally stable polycrystalline diamond (TSP), cubic boron nitride (CBN), and polycrystalline cubic boron nitride (PCBN).

2. The downhole tool part of claim 1, wherein the particulate material is evenly distributed throughout the continuous composite matrix material.

3. The downhole tool part of claim 1, wherein the continuous composite matrix material comprises a eutectic or near eutectic composition of cobalt and monotungsten carbide (WC).

4. The downhole tool part of claim 3, wherein the eutectic or near eutectic composition comprises about 75 atomic percent cobalt and about 25 atomic percent monotungsten carbide (WC).

5. The downhole tool part of claim 4, wherein the eutectic or near eutectic composition has a eutectic temperature of about 1357° C.

6. The downhole tool part of claim 1, wherein the eutectic or near eutectic composition does not include any melting point depressing additives.

7. A downhole tool part for drilling subterranean material, the downhole tool part having a composition comprising:
    a continuous composite matrix material comprising a eutectic or near eutectic composition;
    a particulate material dispersed within the continuous composite matrix material, the particulate material comprising at least one constituent selected from the group consisting of: polycrystalline diamond compact (PDC) thermally stable polycrystalline diamond (TSP), cubic boron nitride (CBN), and polycrystalline cubic boron nitride (PCBN); and
    a sub-stoiciometric phase having the formula $M_xC$, where M is cobalt or tungsten, C is carbide, and x is a number between 1 and 6.

8. A downhole tool part for drilling subterranean material, the downhole tool part having a composition comprising:
    a continuous composite matrix material comprising a eutectic or near eutectic composition, the eutectic or near eutectic composition comprising a carbide and at least one metal; and
    a particulate material dispersed within the continuous composite matrix material, the particulate material comprising at least one constituent selected from the group consisting of: polycrystalline diamond compact (PDC), thermally stable polycrystalline diamond (TSP), cubic boron nitride (CBN), and polycrystalline cubic boron nitride (PCBN);
    wherein the downhole tool part is a bit body or a roller cone.

* * * * *